United States Patent Office 3,387,930
Patented June 11, 1968

3,387,930
PROCESS FOR THE PRODUCTION OF
PHOSPHORIC ACID
John Schertzer and John A. Schols, Sarnia, Ontario,
Canada, assignors to The Dow Chemical Company,
Midland, Mich., a corporation of Delaware
No Drawing. Filed June 16, 1965, Ser. No. 464,576
6 Claims. (Cl. 23—165)

ABSTRACT OF THE DISCLOSURE

This invention relates to a process improvement in the art of producing phosphoric acid from phosphate rock which contains silica. After the phosphate rock has been digested in acid, extracted into a water-immiscible organic extractant and stripped from the organic extractant with water, the substantially acid-depleted extractant is washed with a 1–10 weight percent aqueous solution of $CaCl_2$ to remove the remaining phosphoric acid therefrom. Use of a $CaCl_2$ solution rather than water in the final washing step produces good phase separation and reduces solvent loss to the aqueous phase.

---

This invention relates to a process for the production of phosphoric acid from calcium phosphate-containing sources and more particularly relates to a process whereby phosphoric acid is produced by the acidulation of calcium phosphate-containing ore to produce phosphoric acid which is thereafter absorbed in a trialkyl phosphate extractant and finally stripped therefrom to produce the free acid and liberate the extractant for recycle to the extraction step.

It is known that phosphoric acid may be produced from calcium phosphate source materials by the acidulation thereof with an inorganic acid such as hydrochloric acid, nitric acid or sulfuric acid and extraction of the resulting mixture with a trialkyl phosphate. The extracted phosphoric acid is then stripped from the phosphoric acid-laden trialkyl phosphate by liquid-liquid extraction with water. The extractant layer is removed from the aqueous acid layer and is washed with water to obtain a substantially acid-free trialkyl phosphate which is suitable for recycle and reuse in the extraction step. Such acid leaching of phosphate rock or other calcium phosphate source generally solubilizes small amounts of silica, however, and at least a portion of such silica is extracted into the extractant. In the last stage of the process wherein the solvent is washed with water, the silica is hydrated and precipitates as a hydrated silica complex with the trialkyl phosphate solvent. The presence of such a complex produces poor phase separation and undesirably high solvent losses by entrainment.

It is therefore an object of this invention to provide a process which, in the solvent washing step, provides good phase separation and low entrainment losses in the presence of silica. Another object is to provide a process whereby the formation of a hydrated silica-solvent complex is eliminated. These and other objects and advantages of the present invention will become obvious from a reading of the following detailed specification.

It has now been discovered that, in the process for production of phosphoric acid by the acidulation of calcium phosphate-containing material wherein the phosphoric acid is absorbed in a trialkyl phosphate extractant, the phosphoric acid-laden extractant is subsequently stripped with water to produce phosphoric acid, and the extractant is then additionally purified by washing with water, improved phase separation and greatly decreased solvent losses may be achieved by washing the phosphoric acid-depleted extractant with an aqueous solution of calcium chloride containing from 1 to 10 percent by weight calcium chloride.

The process for the preparation of phosphoric acid by the acidulation of calcium phosphate-containing materials with hydrochloric acid and the subsequent extraction of the phosphoric acid thus produced in a trialkyl phosphate extractant, recovery of the acid therefrom by water stripping, and solvent purification by water washing is well known to the art and is described in detail in U.S. 3,072,416. In the first step of said known process, which step is also used in the improved process of the present invention, the ratio of volume of the extractant to the acidic aqueous reaction mixture is not critical and can be varied widely, but is usually in the range of from about 1:1 to about 5:1 with the preferred ratio being about 3:1. The presence of a water-immiscible diluent for the trialkyl phosphate such as toluene, benzene, xylene, Varsol (an aliphatic hydrocarbon fraction), and the like, is not detrimental to this step. In such a process, when applied to calcium phosphate-containing sources which also contain silica, the extraction of phosphoric acid from the rock liquor simultaneously extracts a small amount of silica into the organic extractant. The silica thus extracted forms a silica complex with the solvent. This material, when hydrated, precipitates and collects at the organic-aqueous interface during the extractant washing step and causes poor phase separation and solvent entrainment into the aqueous effluent.

In a continuous extraction process, such as is commonly used, undesirable extractant losses by entrainment into the aqueous phase are thus produced and such entrained extractant is not easily recoverable. This process, as taught in the literature and as generally practiced, involves a stripping step whereby the phosphoric acid-laden trialkyl phosphate is stripped with water by liquid-liquid contact to produce an aqueous phosphoric acid phase and a trialkyl phosphate phase which must be separated to recover the phosphoric acid. The trialkyl phosphate phase is subsequently washed with water to remove residual phosphoric acid prior to recycling to the extraction section. It has been found that the hydrated silica-solvent complex, which forms when the nearly acid depleted trialkyl phosphate solvent is washed with water, interference with adequate separation of the layers, but such complex may be eliminated by washing and phosphoric acid-depleted trialkyl phosphate with a water solution of calcium chloride rather than with water alone. In order to effectively eliminate the hydrated silica complex, it is necessary that the calcium chloride solution contain from 1 to 10 percent by weight of calcium chloride. With lesser concentrations of calcium chloride, the solution is ineffective at preventing the hydrated silica formation. Calcium chloride concentrations greater than 10 percent adversely affect the removal of the residual phosphoric acid from the alkyl phosphate.

In carrying out the extraction, the aqueous calcium chloride solution is contacted with the phosphoric acid-depleted trialkyl phosphate in a conventional liquid-liquid extraction apparatus, e.g. single or multiple stage mixer-settlers, counter-current contactors and the like, at temperatures from about 0° C. to about 100° C. preferably from about 20° C. to about 50° C. for a period of actual contact ranging from about 1 minute to about 10 minutes per stage. The phase ratio of calcium chloride solution to trialkyl phosphate extract is not critical, although in order to achieve maximum efficiency an amount is employed which will substantially remove all of the phosphoric acid from the solvent phase.

The following examples are for the purpose of illustrating in more detail the invention herein but are not to be construed as limiting the scope of the invention.

Example 1

The problem presented by the presence of a hydrated silica-solvent complex in a counter-current solvent wash was illustrated by carrying out an extraction in a series of 4 successive mixer-settlers permitting settling in each unit. Into the mixer-settlers was continuously fed a mixture of 1 part of water and 8.4 parts of tri-n-butyl phosphate (as a 50 vol. percent solution in Varsol) containing 0.5% by weight phosphoric acid and 0.05% by weight silica. A gelatinous precipitate began to form in the first stage and was also gradually formed in the second stage. Poor phase separation caused a precipitate carry-over from stage to stage leading to entrainment of tributyl phosphate into the aqueous effluent. The entrainment losses amounted to approximately 1–5%.

Example 2

In the same manner as Example 1, 8.4 parts of tri-n-butyl phosphate (as a 50 vol. percent solution in Varsol) containing 0.5% by weight phosphoric acid was fed into a series of four mixer-settlers together with 1 part of an aqueous solution of calcium chloride containing 5 weight percent calcium chloride. No gelatinous precipitate was formed during this experiment. As a result, phase separation was found to be good and the effluent aqueous phase containing substantially no entrained tri-n-butyl phosphate.

Example 3

In the same manner as Example 2, 13.5 parts of tri-n-butyl phosphate (as a 50 vol. percent solution in Varsol) containing 0.5% by weight of phosphoric acid was fed together with 1 part of a 5 weight percent calcium chloride solution into a series of 4 mixer-settlers. Under these conditions good phase separation was achieved and the effluent water contained substantially no entrained tributyl phosphate.

We claim:

1. In the process for the production of phosphoric acid from a calcium phosphate-containing source additionally containing silica wherein said calcium phosphate containing source is digested in an aqueous solution of hydrochloric acid, the phosphoric acid thus produced containing a silica impurity is absorbed in a trialkyl phosphate extractant to form a phosphoric acid-laden trialkyl phosphate containing a silica impurity, said phosphoric acid is stripped from said trialkyl phosphate with water to remove a major portion of the phosphoric acid therefrom, the improvement which comprises washing the phosphoric acid-depleted trialkyl phosphate with an aqueous solution of calcium chloride containing from 1 to 10% by weight calcium chloride, and separating the thus formed aqueous phase from the trialkyl phosphate.

2. The process of claim 1 wherein said washing of the phosphoric acid-depleted trialkyl phosphate is conducted at a temperature of between 0° C. and 100° C.

3. The process of claim 1 wherein said washing of the phosphoric acid-depleted trialkyl phosphate is conducted at a temperature of between 20° C. and 50° C.

4. The process of claim 1 wherein said phosphoric acid-depleted trialkyl phosphate is contacted with said aqueous solution of calcium chloride for a period of between about 1 and 10 minutes per stage.

5. The process of claim 1 wherein said washing of the phosphoric acid-depleted trialkyl phosphate is conducted at a temperature of between 20° C. and 50° C. and for a period of from about 1 to 10 minutes per stage.

6. The process of claim 1 wherein the trialkyl phosphate is tri-n-butyl phosphate.

References Cited

UNITED STATES PATENTS

| | | | |
|---|---|---|---|
| 3,072,461 | 1/1963 | Pong et al. | 23—165 |
| 3,304,157 | 2/1967 | Baniel et al. | 23—165 |

OSCAR R. VERTIZ, *Primary Examiner.*

MILTON WEISSMAN, *Examiner.*

A. GREIF, *Assistant Examiner.*